S. S. MATTHES.
COLLAR SHAPING AND EDGING MACHINE FOR LAUNDRY USE.
APPLICATION FILED OCT. 31, 1912. RENEWED AUG. 4, 1916.
1,199,289.
Patented Sept. 26, 1916.
2 SHEETS—SHEET 1.
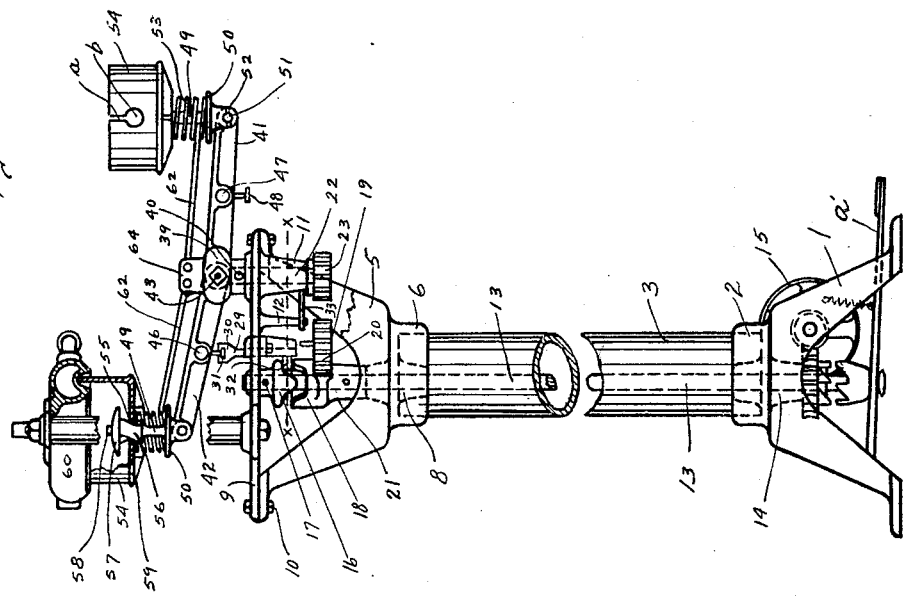
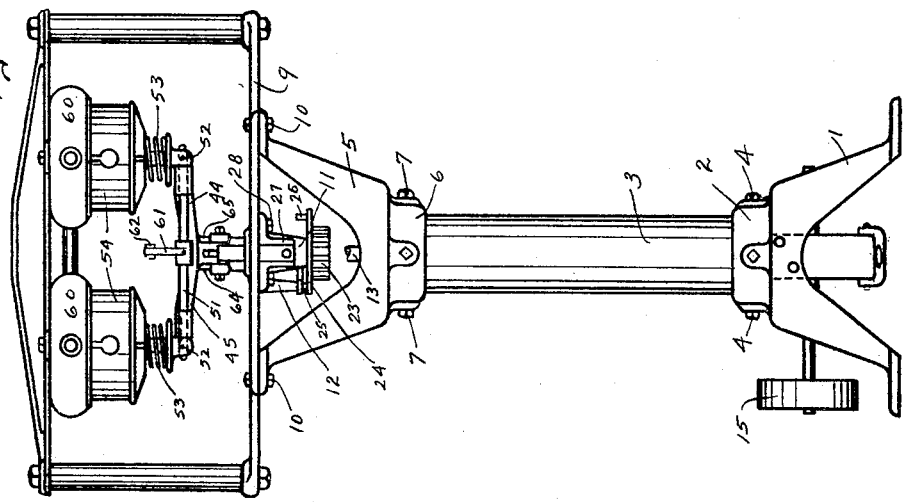

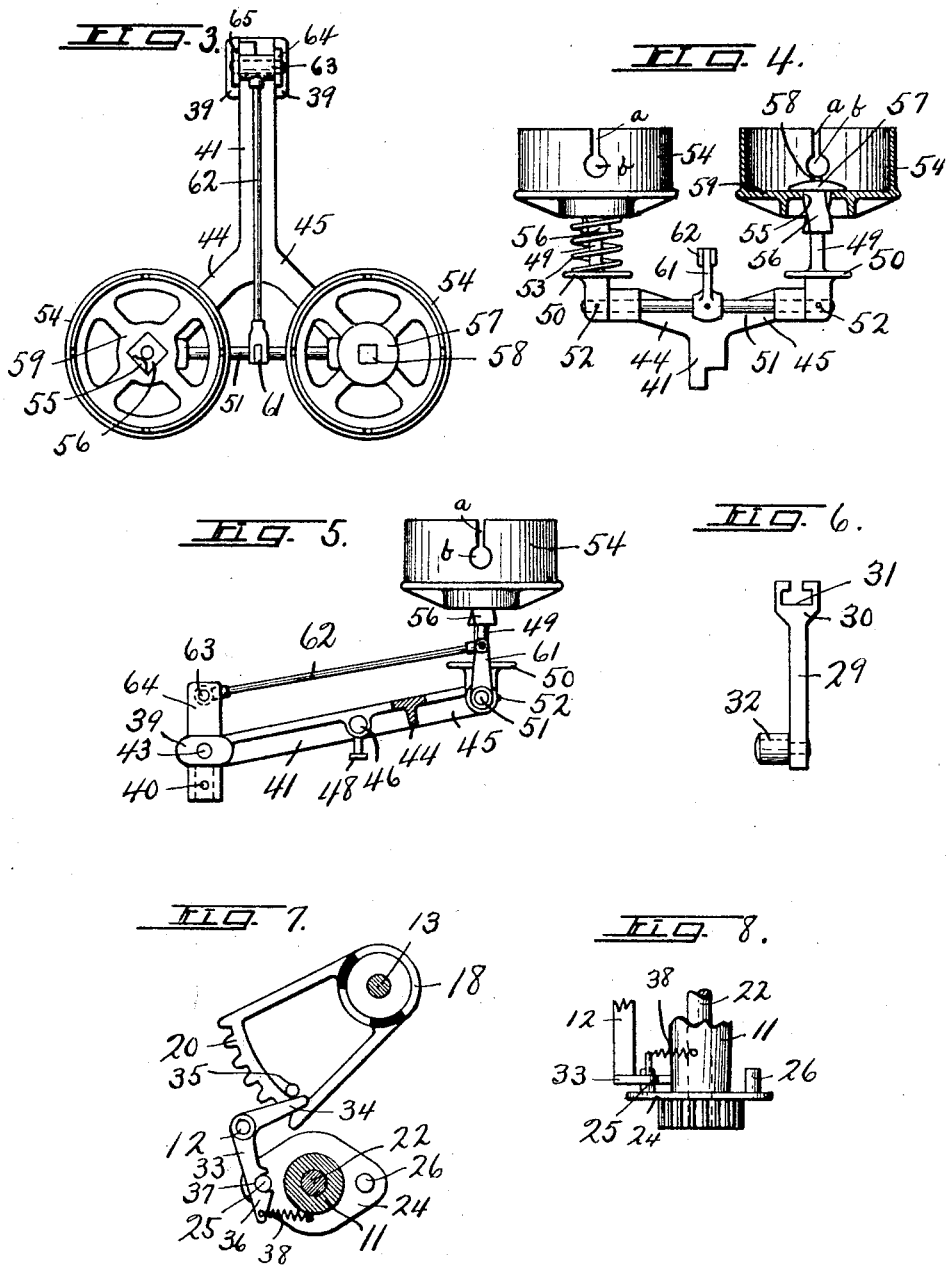

UNITED STATES PATENT OFFICE.

SAMUEL S. MATTHES, OF MANSFIELD, OHIO, ASSIGNOR TO NATIONAL CHEMICAL COMPANY, OF SYRACUSE, NEW YORK, A CORPORATION OF NEW YORK.

COLLAR SHAPING AND EDGING MACHINE FOR LAUNDRY USE.

1,199,289.     Specification of Letters Patent.     Patented Sept. 26, 1916.

Application filed October 31, 1912, Serial No. 728,889. Renewed August 4, 1916. Serial No. 113,207.

*To all whom it may concern:*

Be it known that I, SAMUEL S. MATTHES, a citizen of the United States of America, residing at Mansfield, in the county of Richland and State of Ohio, have invented certain new and useful Improvements in Collar Shaping and Edging Machines for Laundry Use, of which the following is a specification.

This invention relates to improvements in a collar shaping and edging machine for laundry use, for which an application for a patent was filed by me on May 24, 1912, Serial No. 699,404, and reference is hereby made to the pending application of W. J. Quinn, Ser. No. 609,415, filed February 18, 1911, and the pending application of W. W. Quinn, Ser. No. 627,500, filed May 16, 1911, and the pending application of J. J. Seltenreich, Ser. No. 687,153, filed March 29, 1912, and no claim is made herein to the invention or inventions disclosed in any of the above identified applications.

The objects of my invention are to provide means for imparting a winding or rotary movement to the cylinders when they are forced in yielding contact with the steam chests, for ironing purposes; to provide positive means of stopping and locking the swinging arms, which carry the cylinders, in a pre-determined position; and to provide an improved means of maintaining the upper edges of the cylinders parallel, irrespective of their upward or downward travel. I attain these and other objects by the mechanism illustrated in the accompanying drawings, in which:

Figure 1 is a rear view of the machine as it appears when the cylinders are in yielding contact with the steam-chests. Fig. 2 is a side view of the machine showing one of the cylinders and one of the steam-chests partly in section, in yielding contact with each other. Also showing the means of rotating the cylinder in its upper position. Fig. 3 is a plan view showing the pivotal connection of one of the arms with a supporting member and the cylinders which are mounted on the diverging members of the arm. Fig. 4 is an end view of Fig. 3 showing one of the cylinders partly in section. Fig. 5 is a side view of Fig. 3. Fig. 6 is a detail view of my improved sliding-bar and roller which actuates the pivotal arms carrying the cylinders. Fig. 7 is a plan view taken on the line *x*—*x* of Fig. 2 showing the improved stop and locking mechanism for the swinging-arms which carry the cylinders. Fig. 8 is a side view of Fig. 7.

Referring to the drawings, reference numeral 1 represents a base having an upwardly projecting boss 2. The boss is counter-bored to receive and support one end of a pipe 3 which is rigidly secured thereto by bolts 4. A bracket 5 is provided with a counter-bored boss 6 and attached to the upper or free end of the pipe 3 and held in place by the bolts 7. The bracket 5 is also provided with a bearing 8. A plate 9 is secured to the top of the bracket 5 by the bolts 10 and is provided with depending bosses 11 and 12.

A driving-shaft 13 is journaled in the plate 9 at one end and at the opposite end in the bearing 14. A pulley 15, through suitable mechanism, transmits movement to the shaft 13 and is thrown in and out of operation by a suitable clutch mechanism. The treadle *a'* is normally raised by a spring to hold the jaws of the clutch in engagement, and the depression of the treadle separates the jaws and stops the machine. A cam-faced collar 16 is fastened to the upper end of the shaft 13 by means of a set-screw 17. A cam 18, the outline of its face corresponding in contour with the face of the collar 16, and provided with an outwardly projecting portion 19 carrying teeth 20, is provided. The cam is provided with a depending portion 21 and is rigidly fastened to the shaft 13, a pre-determined distance from the face of the collar 16.

A stub shaft 22 is vertically supported in a bearing provided in the boss 11 and carries a gear 23 having an enlarged flange 24 to which the pins 25 and 26 are secured. The gear is secured to the end of the shaft 22 in line with the teeth of the projecting portion 19 of the cam 18 and adapted to periodically mesh therewith. A vertical bracket 27, having a vertical slot, is secured to the plate 9 by bolts 28. An actuating sliding bar 29, having an enlarged portion 30 at its upper end provided with a T slot 31, and a roller 32 secured to the lower end, is adapted to slide in the slot of the bracket 27 when movement is imparted to it through the medium of the cam 18 with which the roller 32 engages, being guided and held in place by the face of the collar 16.

Upon the boss 12 is pivoted a bell-crank 33, one end 34 of which extends over the projecting portion 19 of the cam 18 in the path of a pin 35, and the opposite end 36 is provided with a notch 37 and extends over the flange 24, and is adapted to engage the pins 25 and 26. A coil-spring 38 is secured to the end 36 of the bell-crank and its opposite end is attached to the boss 11.

It will be noted that the end 36 of the bell-crank is yieldingly held in contact with either of the pins 25 or 26 through the medium of the notch 37 and the spring 38. When the pin 35 contacts with the end 34 of the bell-crank, the end 36 of the bell-crank is forced out of engagement with either of the pins, permitting the flange 24 to be rotated until it reaches a pre-determined point, when the end 36 engages either one of the pins 25 or 26 and securely retains the flange in the pre-determined position.

At the upper end of the stub-shaft 22, a bifurcated supporting member 39 is secured by a pin 40 and it is adapted to receive one end of the arms 41 and 42 which are joined and pivotally connected thereto by a bolt 43 for vertical oscillating movement. Each arm is provided with diverging members 44 and 45. The arms 41 and 42 are provided with horizontal stud shafts 46 and 47 and T-shaped members 48 are attached thereto and adapted to pivot slightly so that they will readily engage the T slot 31 of the actuating bar 29. Shafts 49, which are provided with supporting members 50, are pivotally attached to the shaft 51 by the pins 52. Springs 53, or other resilient members, are mounted upon the supporting members 50. The cylinders 54 have spirally formed apertures 55 formed in the center of the bottom thereof to engage with the spiral members 56 of the shafts 49.

Washers 57 are secured to the ends of the spiral members 56 by bolts 58 leaving the bottom 59 of the cylinders interposed between the washers 57 and the resilient or spring members 53. The purpose of the washers is to limit the upward movement of the cylinders which are normally held, under the pressure of the resilient members which yieldingly hold the bottoms of the cylinders in contact with the washers.

In order to maintain the cylinders on a plane or parallel with the steam-chests 60, when movement is imparted to the arms 41 and 42, cranks 61 are secured to the shafts 51 and rods 62 secured to the cranks at one end and the opposite ends of the rods are attached to a pin 63 which passes through the up-standing portions 64 and 65 of the supporting member 39.

The cylinders are provided with slots $a$ which intersect apertures $b$ thereby permitting slight expansion of the upper portion of the cylinder when the edge of a cylinder is forced in contact with a steam chest as hereinbefore described. The purpose of expanding the upper portion of the cylinders is to provide for the variation of the thickness of the collars along the seam.

The operation of my device is as follows: Movement is imparted to the shaft 13, upon which is mounted the cam 18 and the collar 16, both rotating together. The faces of the collar and cam correspond with each other. The sliding actuating bar 29 is provided with a roller 32 which projects therefrom. The roller 32 projects between and engages with the face of the collar 16 and the face of the cam 18. As the roller 32 is engaged between the face of the cam 18 and the face of the collar 16 when movement is imparted to the cam 18, the sliding bar 29 to which the roller is attached, is actuated vertically and when the arms 41 and 42 are rotated to a predetermined position the T-shaped member 48 engages in the T slot 31, provided in the sliding bar 29, thereby imparting an upward movement to the arm, forcing the cylinder which is carried by the arm in contact with the steam chest. When the cylinders, which are yieldingly mounted upon the springs 53, are forced in contact with the steam chest the spiral members 56 (which engage the spiral apertures formed in the cylinders) are forced upward, thereby imparting a rotary movement to the cylinders.

It will be noted that the movement imparted to the cylinders not only shapes the collar, even though it is not of uniform size or thickness, but also, through the medium of the rotary movement imparted to the cylinders by the spiral members 56 by frictional contact with the collar, irons it as the collar is interposed between the cylinder and the steam chest.

Although I have shown one particular means, such as steam, for heating the shaping heads —60—, I do not limit myself to such means, as it is readily apparent that these heads may be heated in various well-known ways and by various means without departing from the spirit of this invention as set forth in the appended claims.

What I claim is:

1. In a shaping and edging machine for collars, a frame, a vertical shaft mounted on said frame, means to impart movement to said vertical shaft, pivotal arms independently mounted on said frame, automatic means to impart a vertical oscillating movement to said arms, shaping heads mounted on said frame, cylinders mounted on the free ends of the pivotal arms to contact with said heads, and means to impart a rotary movement to said cylinders.

2. In a shaping and edging machine for collars, a frame, a vertical shaft mounted on said frame, means to impart movement to said vertical shaft, pivotal arms independently mounted on said frame, automatic means to impart a vertical oscillating movement to said arms, shaping heads mounted on said frame, cylinders mounted on the free ends of the pivotal arms to contact with said heads, said cylinders having spiral apertures provided therein, and means to engage with said spiral apertures to impart a rotary movement to said cylinders.

3. In a shaping and edging machine for collars, a frame, a vertical shaft mounted on said frame, means to impart movement to said vertical shaft, pivotal arms independently mounted on said frame, automatic means to impart a vertical oscillating movement to said arms, shaping heads mounted on said frame, cylinders mounted on the free ends of the pivotal arms to contact with said heads, said cylinders having spiral apertures provided therein, means to engage with said spiral apertures to impart a rotary movement to said cylinders, and resilient means to yieldingly support said cylinders.

4. In a shaping and edging machine for collars, a frame, a vertical shaft mounted on said frame, means to impart movement to said vertical shaft, pivotal arms independently mounted on the frame, automatic means to impart a vertical oscillating movement to said pivotal arms, shaping heads mounted on said frame, cylinders mounted on the free ends of the pivotal arms to contact with said heads, automatic means to rotate said arms in a horizontal plane and means to impart rotary movement to said cylinders.

5. In a shaping and edging machine for collars, a frame, a vertical shaft mounted on said frame, means to impart movement to said vertical shaft, pivotal arms independently mounted on said frame, automatic means to impart a vertical oscillating movement to said pivotal arms, shaping heads mounted on said frame, cylinders mounted on the free ends of the pivotal arms to contact with said heads, automatic means to rotate said arms in a horizontal plane, said cylinders having spiral apertures provided therein, and means to engage with said spiral apertures to impart a rotary movement to said cylinders.

6. In a shaping and edging machine for collars, a frame, a vertical shaft mounted on said frame, means to impart movement to said vertical shaft, pivotal arms independently mounted on said frame, automatic means to impart a vertical oscillating movement to said pivotal arms, shaping heads mounted on said frame, cylinders mounted on the free ends of the pivotal arms to contact with said heads, automatic means to rotate said arms in a horizontal plane, said cylinders having spiral apertures provided therein, means to engage with said spiral apertures to impart a rotary movement to said cylinders, and resilient members to yieldingly support said cylinders.

7. In a collar shaping and edging machine, a collar shaping head and a collar support, means for moving one of said elements into pressing coaction with the other, and means for causing a rotary oscillating movement of one of said elements as they are brought into and returned from pressing coaction.

8. In a shaping and edging machine, a collar shaping head and a collar support, means for bringing said elements into pressing coaction, one of said elements being yieldingly mounted and adapted to be depressed when the elements are brought into pressing coaction, and means actuated by the depressing of said element for causing a rotary movement of the same.

9. In a shaping and edging machine, a collar shaping head and a collar support, means for bringing said elements into pressing coaction, one of said elements being yieldingly mounted and adapted to be depressed when the elements are brought into pressing coaction, and a spirally arranged guide for causing rotary movement of said element as it is depressed.

10. In a shaping and edging machine for collars, a collar shaping head and a collar support, means for bringing said elements into pressing coaction, in combination with spiral operating means to impart rotary oscillatory movement to one of said elements when they are brought into and returned from pressing coaction.

11. In a collar shaping and edging machine, a collar shaping head and a collar support adapted to be brought into pressing coaction, and having substantially circular coaxial pressing faces, and means operating in connection with the pressing coaction of said elements for causing a rotary movement of one of the same.

12. In a collar molding machine, the combination of two elements, one a head having a socket and the other a ring for receiving the collar, the head and ring having relative movement one toward and from the other for interfitting the ring with the collar thereon and the socket to mold the collar, and one of said elements having a rotative movement relatively to the other when the parts are in interfitting relation, a carriage for the rotative element, a spring interposed between said rotative element and its carriage for permitting yielding of the rotative element axially when the elements are brought into interfitting relation, and coacting surfaces provided respectively on the rotative element and its carriage, one of the surfaces being inclined relatively to the direction of movement of one element toward and from the other and arranged to effect a rotative movement during the action of the spring, substantially as and for the purpose set forth.

13. In a collar shaping and edging machine, a shaping head having a socket, a ring for receiving a collar, means carrying said ring, said means rotatable about an axis eccentric to the socket in the head to move the ring into and out of registration with said socket, a cam, a member having a part adapted to contact with said cam whereby rotation of the cam causes vertical movement of said member, said member in its vertical movement adapted to move the ring-carrying means to bring the ring into interfitting relation with the socket in the head to shape the collar, and means for rotating the ring while in interfitting relation with the socket in the head.

14. In a collar molding machine, the combination of two elements, one a head having a socket and the other a ring for receiving the collar, the head and ring having relative movement one toward and from the other for interfitting the ring with the collar thereon and the socket to mold the collar, and one of said elements having a rotary oscillating movement relatively to the other when the parts are in interfitting relation, a carriage for the rotative element, a spring interposed between said rotative element and its carriage for permitting yielding of the rotative element axially when the elements are brought into interfitting relation, and coacting surfaces provided respectively on the rotative element and its carriage, one of the surfaces being inclined relatively to the direction of movement of one element toward and from the other and arranged to effect a rotary oscillating movement during the action of the spring, substantially as and for the purpose set forth.

15. In a collar molding machine, the combination of a head having a socket, a ring for receiving the collar, the ring being movable toward and from the head for interfitting the ring with the collar thereon and the socket to mold the collar, a carriage for the ring including a bearing, the ring having a hub supported by and slidable axially of the bearing, a spring between the carriage and the hub, said spring permitting the ring to yield relatively to the carriage when in interfitting relation with the head, and means for moving the carriage and for rotatably oscillating the ring relatively to the head during the yielding of the spring, substantially as and for the purpose described.

In testimony whereof I affix my signature in presence of two witnesses.

SAMUEL S. MATTHES.

Witnesses:
JOHN H. COSS,
PEARL M. YUNCKER.

Copies of this patent may be obtained for five cents each, by addressing the "Commissioner of Patents, Washington, D. C."